(12) United States Patent
Cain, III et al.

(10) Patent No.: US 9,870,384 B2
(45) Date of Patent: Jan. 16, 2018

(54) DATABASE SYSTEM TRANSACTION MANAGEMENT

(75) Inventors: Harold Wade Cain, III, Katonah, NY (US); Donna N. Dillenberger, Yorktown Heights, NY (US); Michel H. T. Hack, Cortlandt Manor, NY (US); Hong Min, Poughkeepsie, NY (US); Gong Su, New York, NY (US); James Zu-Chia Teng, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/435,281

(22) Filed: Mar. 30, 2012

(65) Prior Publication Data

US 2013/0262424 A1 Oct. 3, 2013

(51) Int. Cl.
 *G06F 17/30* (2006.01)
(52) U.S. Cl.
 CPC .............................. *G06F 17/30351* (2013.01)
(58) Field of Classification Search
 None
 See application file for complete search history.

(56) References Cited

U.S. PATENT DOCUMENTS

| | | | | |
|---|---|---|---|---|
| 5,764,897 A | * | 6/1998 | Khalidi | 709/201 |
| 5,799,305 A | * | 8/1998 | Bortvedt | G06F 9/466 |
| 6,097,292 A | * | 8/2000 | Kelly | G06K 7/0008 |
| | | | | 235/385 |
| 6,158,044 A | * | 12/2000 | Tibbetts | 717/100 |
| 6,662,202 B1 | * | 12/2003 | Krusche | G06F 9/466 |
| | | | | 707/999.202 |
| 6,687,878 B1 | * | 2/2004 | Eintracht et al. | 715/201 |
| 6,915,254 B1 | * | 7/2005 | Heinze et al. | 704/9 |
| 7,213,020 B1 | * | 5/2007 | Pal | G06F 17/30377 |
| | | | | 707/703 |
| 7,421,458 B1 | * | 9/2008 | Taylor et al. | |
| 7,444,349 B1 | | 10/2008 | Ochotta | |
| 7,634,520 B1 | * | 12/2009 | Seiler | G06F 17/30309 |

(Continued)

FOREIGN PATENT DOCUMENTS

| | | |
|---|---|---|
| CN | 101681294 A | 3/2010 |
| CN | 101699439 A | 4/2010 |

(Continued)

*Primary Examiner* — Augustine K Obisesan
(74) *Attorney, Agent, or Firm* — Ference & Associates LLC

(57) ABSTRACT

Systems, methods, and products for database system transaction management are provided herein. One aspect provides for annotating via a computing device at least one data object residing on the computing device utilizing at least one transaction tag, the at least one transaction tag being configured to indicate a status of an associated data object; processing at least one database transaction utilizing a transactional memory process, wherein access to the at least one data object is determined based on the status of the at least one data object; and updating the status of the at least one data object responsive to an attempted access of the at least one data object by the at least one database transaction. Other embodiments and aspects are also described herein.

20 Claims, 8 Drawing Sheets

(56) References Cited

U.S. PATENT DOCUMENTS

| | | | |
|---|---|---|---|
| 8,321,871 B1* | 11/2012 | Jackson | G06F 9/5027 709/226 |
| 2002/0129001 A1* | 9/2002 | Levkoff et al. | 707/1 |
| 2002/0188831 A1* | 12/2002 | Jackson | G06F 11/3466 712/227 |
| 2004/0117371 A1* | 6/2004 | Bhide | G06F 21/6218 |
| 2004/0187127 A1* | 9/2004 | Gondi et al. | 718/100 |
| 2005/0080723 A1* | 4/2005 | Burchetta et al. | 705/39 |
| 2006/0085591 A1* | 4/2006 | Kumar et al. | 711/113 |
| 2006/0195476 A1* | 8/2006 | Nori et al. | 707/104.1 |
| 2007/0182818 A1* | 8/2007 | Buehler | 348/143 |
| 2007/0198518 A1* | 8/2007 | Luchangco et al. | 707/8 |
| 2007/0250419 A1* | 10/2007 | Kumar et al. | 705/34 |
| 2008/0104332 A1* | 5/2008 | Gaither et al. | 711/141 |
| 2008/0120484 A1* | 5/2008 | Zhang et al. | 711/163 |
| 2008/0229185 A1* | 9/2008 | Lynch | 715/230 |
| 2009/0006406 A1* | 1/2009 | Taillefer | 707/8 |
| 2009/0077083 A1 | 3/2009 | Magruder et al. | |
| 2009/0235254 A1 | 9/2009 | Michael | |
| 2010/0114847 A1* | 5/2010 | Giampaolo et al. | 707/695 |
| 2010/0211682 A1* | 8/2010 | Capomassi | G06F 17/30353 709/226 |
| 2010/0218195 A1 | 8/2010 | Adl-Tabatabai et al. | |
| 2011/0055483 A1* | 3/2011 | Heller, Jr. | G06F 9/466 711/125 |
| 2011/0137962 A1 | 6/2011 | McKenney et al. | |
| 2011/0197029 A1 | 8/2011 | Saha et al. | |
| 2012/0005530 A1 | 1/2012 | Marathe et al. | |
| 2012/0102006 A1* | 4/2012 | Larson et al. | 707/703 |
| 2012/0303577 A1* | 11/2012 | Calder et al. | 707/613 |

FOREIGN PATENT DOCUMENTS

| | | |
|---|---|---|
| CN | 101807169 A | 8/2010 |
| CN | 102375892 A | 3/2012 |

* cited by examiner

| Application Code | Compiler Transformed Execution |
|---|---|
| data structure<br>*typedef struct<*<br>*transactional_tagged> sample {*<br>*field_1 f1,*<br>*field_2 f2,*<br>*...*<br>*field_k fk;*<br>*}* | data structure<br>*typedef struct sample {*<br>*typedef struct sample_tx_tag {*<br>*int tx_tag_write , // initialize*<br>*to 0*<br>*int tx_tag_read ; // initialize*<br>*to 0*<br>*typedef struct sample_data{*<br>*field_1 f1,*<br>*field_2 f2,*<br>*...*<br>*field_k fk;*<br>*}}* |

FIG. 4A

| Application Code | Compiler Transformed Execution |
| --- | --- |
| code flow for write<br>sample samp_instance;<br>Tagged_Tx_begin;<br>update (samp_instance);<br>Tagged_Tx_end ; | sample samp_instance;<br>// 1) try to update tags for write<br>B1:<br>Tx_begin { // existing HTM API<br>if (samp_instance.tx_tag_write > 0)//write_write conflicts<br>Tx_abort;<br>if (samp_instance.tx_tag_read > 0) //read_write conflicts<br>Tx_abort;<br>samp_instance.tx_tag_write ++; }<br>Tx_end ; // existing HTM API<br>// retry or go-away if above fails<br>if ( above is status_Tx_abort ) retry B1 ; // immediately.<br>//or suspend and try later<br>//or do something else and try later<br>// update data lock free is above is committed<br>if ( above is status_Tx_commit)<br>broadcast(write)<br>update(samp_instance_data);<br>B2: // now decrease<br>samp_instance.tx_tag_write<br>Tx_begin // existing HTM API<br>{ samp_instance.tx_tag_write --;}<br>Tx_end ; // existing HTM API<br>if ( above is status_Tx_abort ) retry B2 ; // immediately.<br>//or suspend and try later Or do something else and try later |

FIG. 4B

| Application Code | Compiler Transformed Execution |
|---|---|
| code flow for read<br>sample samp_instance;<br>Tagged_Tran_start;<br>read (samp_instance);<br>Tagged_Tran_end ; | sample samp_instance;<br>// 1) try to update tags for read<br>B1:<br>Tx_begin // existing HTM API<br>{<br>if (samp_instance.tx_tag_write > 0) //read_write conflicts<br>Tx_abort;<br>samp_instance.tx_tag_read ++;<br>}<br>Tx_end ; // existing HTM API<br>// retry or go-away if above fails<br>if ( above is status_Tx_abort )<br>go to B1 and retry ; // or do something else<br>// update data lock free is above is committed<br>if ( above is status_Tx_commit)<br>read(samp_instance_data);<br>B2: // now decrease<br>samp_instance.tx_tag_write<br>Tx_begin // existing HTM API<br>{<br>samp_instance.tx_tag_read --;<br>}<br>Tx_end ; // existing HTM API<br>if ( above is status_Tx_abort)<br>go to B2 and retry ; |

FIG. 4C

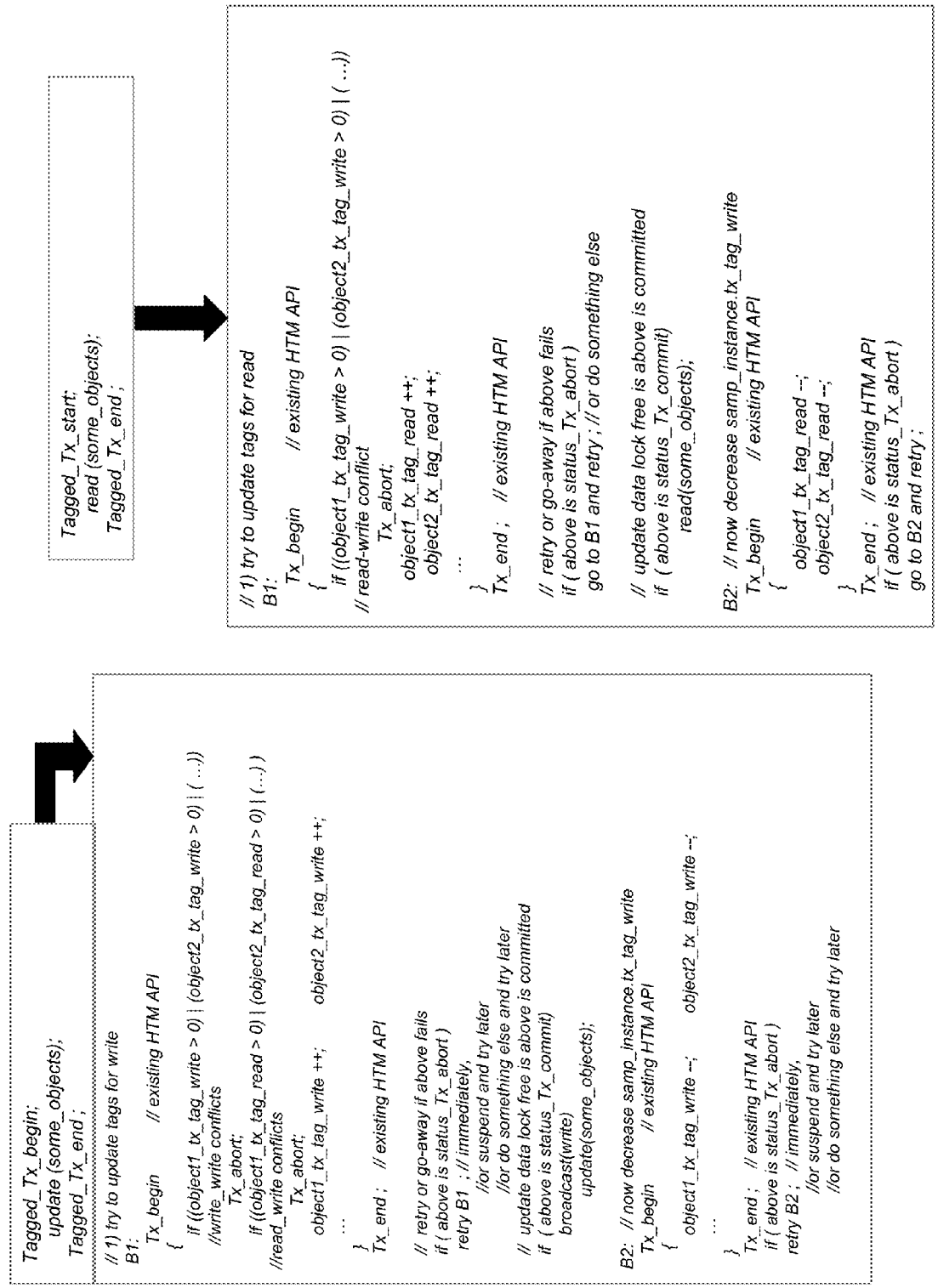

DATABASE SYSTEM TRANSACTION MANAGEMENT

FIELD OF THE INVENTION

The subject matter presented herein generally relates to data transaction processing and management in a database management system (DBMS) utilizing transactional memory in particular.

BACKGROUND

Transactional memory (TM) is a concurrency control mechanism to simplify and enable less error prone parallel programming. In general, TM provides a flexible method for programs to read and modify disparate memory locations atomically as a single operation, in a manner similar to atomic database transaction that modify many records on disk. For example, TM may utilize an optimistic approach to potentially increase execution concurrency for multi-threaded programs that access the same or overlapping sets of multiple memory locations. To achieve optimistic execution, a TM execution environment may rely on certain features, including conflict detection, version management, and conflict resolution. TM may be implemented in hardware (HTM), software (STM), or a hybrid combination of both hardware and software.

BRIEF SUMMARY

One aspect provides a system comprising: at least one processor; and a memory device operatively connected to the at least one processor; wherein, responsive to execution of program instructions accessible to the at least one processor, the at least one processor is configured to: annotate at least one data object utilizing at least one transaction tag, the at least one transaction tag being configured to indicate a status of an associated data object; process at least one database transaction utilizing a transactional memory process, wherein access to the at least one data object is determined based on the status of the at least one data object; and update the status of the at least one data object responsive to an attempted access of the at least one data object by the at least one database transaction.

Another aspect provides a method comprising: annotating via a computing device at least one data object residing on the computing device utilizing at least one transaction tag, the at least one transaction tag being configured to indicate a status of an associated data object; processing at least one database transaction utilizing a transactional memory process, wherein access to the at least one data object is determined based on the status of the at least one data object; and updating the status of the at least one data object responsive to an attempted access of the at least one data object by the at least one database transaction.

A further aspect provides a computer program product comprising: a computer readable storage medium having computer readable program code embodied therewith, the computer readable program code comprising: computer readable program code configured to annotate at least one data object utilizing at least one transaction tag, the at least one transaction tag being configured to indicate a status of an associated data object; computer readable program code configured to process at least one database transaction utilizing a transactional memory process, wherein access to the at least one data object is determined based on the status of the at least one data object; and computer readable program code configured to update the status of the at least one data object responsive to an attempted access of the at least one data object by the at least one database transaction.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

BRIEF DESCRIPTION OF THE SEVERAL VIEWS OF THE DRAWINGS

FIGS. 4A-4C provides example application programming interfaces (APIs) and associated implementations according to embodiments.

FIGS. 5A and 5B provide application programming interfaces (APIs) and implementation transformations configured according to embodiments.

DETAILED DESCRIPTION

Figure 1:
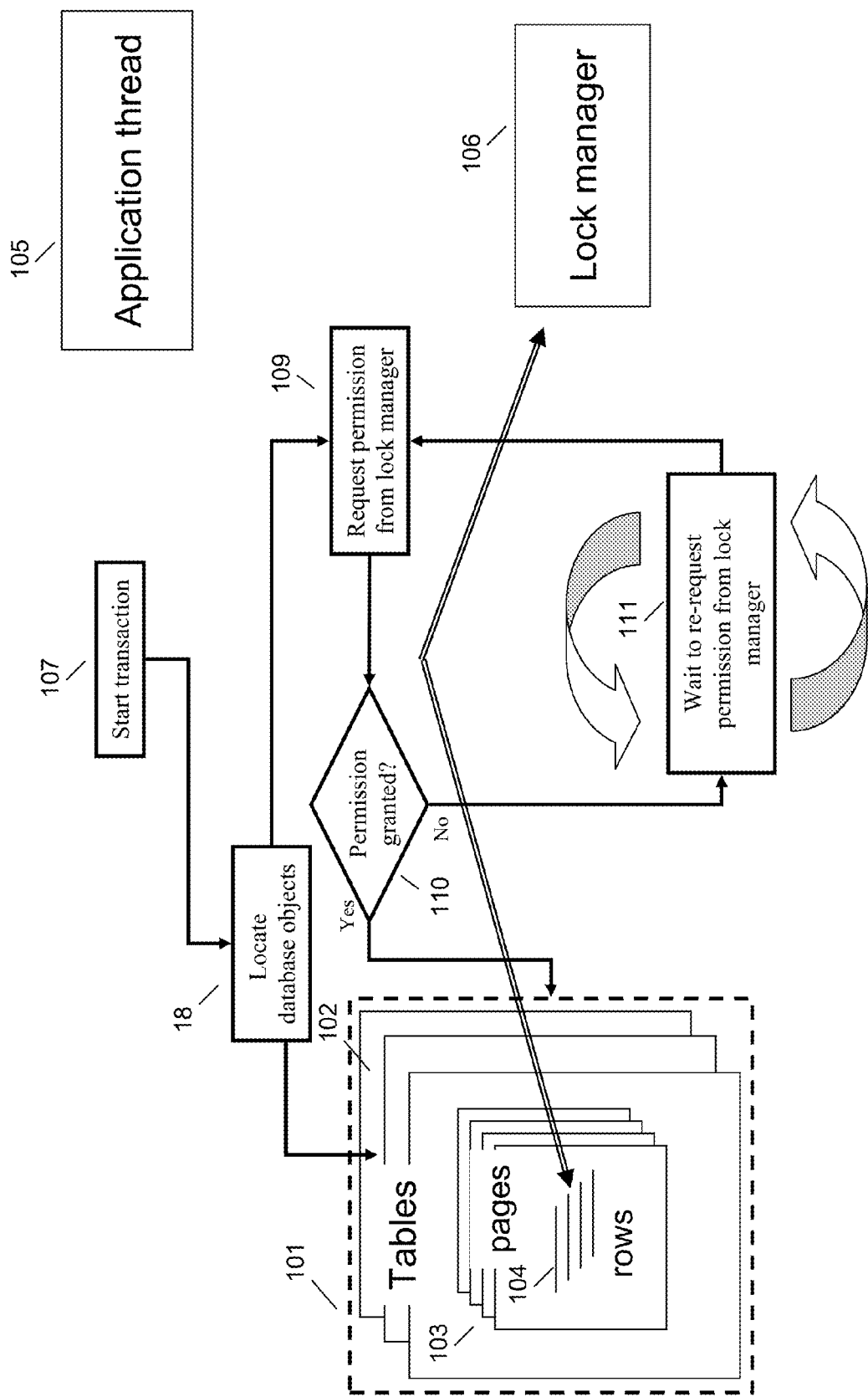
FIG. 1 provides an example transaction process in a database system.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the claims, but is merely representative of those embodiments.

Reference throughout this specification to "embodiment(s)" (or the like) means that a particular feature, structure, or characteristic described in connection with the embodiment is included in at least one embodiment. Thus, appearances of the phrases "according to embodiments" or "an embodiment" (or the like) in various places throughout this specification are not necessarily all referring to the same embodiment.

Furthermore, the described features, structures, or characteristics may be combined in any suitable manner in different embodiments. In the following description, numerous specific details are provided to give a thorough understanding of example embodiments. One skilled in the relevant art will recognize, however, that aspects can be practiced without certain specific details, or with other methods, components, materials, et cetera. In other instances, well-known structures, materials, or operations are not shown or described in detail to avoid obfuscation.

Transactional memory (TM) provides many advantages, including simplifying parallel programming and reducing the difficulty associated with writing concurrent programs. Nonetheless, TM also comes with its own price, such as performance overhead due to the need to keep transaction logs and to detect and resolve conflicts. The overhead may be minimized by implementing TM completely in hardware (HTM). However, this necessarily limits the data size a transaction can access due to limited hardware resources and any underlying cache coherency protocol that may be employed by HTM for multi-data coherency support. Therefore, for transactions that access a large amount of data, systems must either fall back to traditional locking procedures or use software TM (SMT), which may lose the concurrency benefit due to very high performance overhead.

A TM enabled program declares a transaction scope as a critical execution section that touches one or more memory locations. HTM resolves the conflicts at the granularity of a memory manipulation unit such as a cache line. From the prospective of declaring a unit of work and its recovery, similar constructs exist in database management systems (DBMS). For example, an application may declare a "start of the unit of recovery (UR)" before reading or modifying a set of database objects. At some point, the application may issue a "commit" or "roll back" to confirm the changes to the database or to undo all the changes since the "start of the UR" command.

In general, a database record may be any size supported by the DBMS. A software lock manager may be utilized by a DBMS to serialize the concurrent accesses to the same data entities, wherein only the thread that obtains the lock can proceed to its access. Depending on the application semantics, other threads with access intention on same entities may be blocked, which may also depend on semantics. A lock manager may distinguish objects by their names or identifiers. As such, serialization granularity may be achieved at table level, file level (a table may be partitioned and span multiple files), records level, or page level (one or more records may be stored on a page or span across multiple pages, which is also the unit of I/O). However, object locking may be costly. Transitioning between the hierarchies of different lock levels may also be possible. Ultimately, it is a trade-off among concurrency, performance, and system resources. In addition, serializing access at each object via locking in an environment where a transaction scope covers multiple objects may also lead to dead lock situations that a lock manager has to resolve.

Referring to FIG. 1, therein is provided an example database management process. A system is comprised of a database 101 containing tables 102, pages 103, and rows 104, an application thread 105, and a lock manager 106. A transaction is started 107 and one or more objects (e.g., table.page.row within the database 101) are located 108. Lock manager permission is requested 109 to access the one or more objects. If permission is granted 110, the one or more objects may be accessed, otherwise, the process waits 111. The process loops back to again request permission to access an object 109. The process may be configured to commits or aborts transactions and releases any active locks.

Hardware transaction management (HTM) is a hardware assisted lock-free mechanism to handle data access conflict resolution. It offers good performance along with its own limitations, such as data size limitation and an inability to manage concurrent access at different object hierarchy level. In addition to records, pages, files, and tables, many applications require atomic operations on larger data structures, especially those data types such as text, XML documents, binary objects, and images.

Accordingly, embodiments provide a transaction processing system operating with the assistance of HTM and configured to operate without a lock manager. For example, embodiments provide a hybrid approach combining an optimistic mechanism and a blocking mechanism for database transaction execution on various data objects. The hybrid approach for database transaction execution arranged according to embodiments may be configured to takes advantage of TM's simplified programming interface and utilize HTM to handle part of conflict detection and resolution for better performance than a lock manager. Database object transactions using the hybrid approach as disclosed herein may operate by augmenting data base object structure to take advantage of TM, while maintaining data consistency within a data object without the need of accessing all the memory locations that the object occupies. In a non limiting example, APIs may be provided for handling database objects, including, but not limited to, APIs for data tagging/annotation to mitigate transaction size limitations, wherein a language interpreter or compiler may be utilized to handle any annotation translation. Transaction processing configured according to embodiments may achieve, inter alia, better performance than existing transaction processing systems and reduced deadlock or lock-wait timeout.

Figure 2:
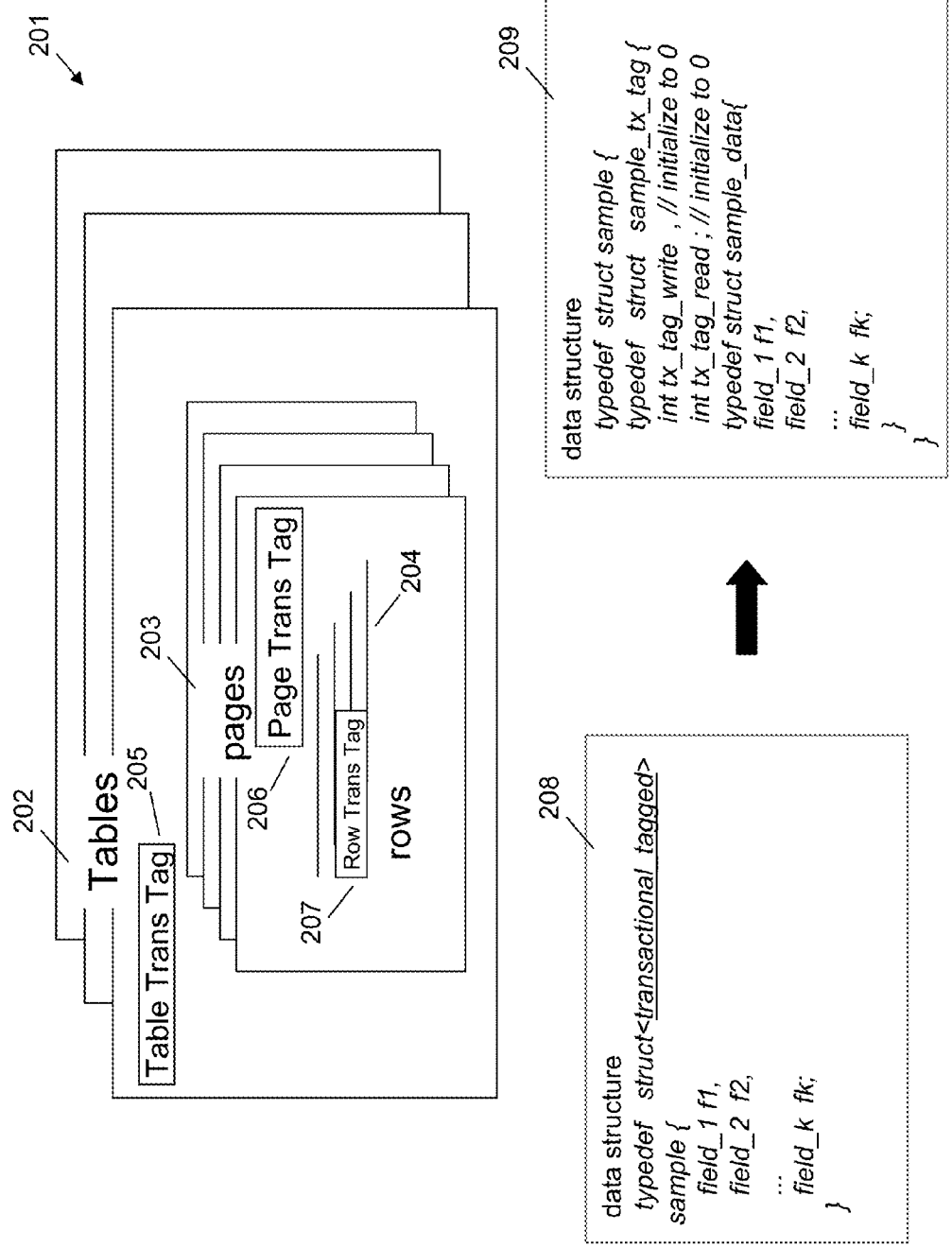
FIG. 2 provides example object data structures configured according to embodiments.

FIG. 2 provides example objects within a hybrid system configured according to embodiments. The hybrid system is comprised of a database 201 consisting of tables 202, pages 203, and rows 204. According to embodiments, tags may be added to system objects, which are transparent to a system application associated with the objects (e.g., an application thread). As shown in FIG. 2, a table transactional tag 205 may be associated with a table 202, a page transactional tag 206 may be associated with a page 203, and a row transactional tag 207 may be associated with a row 204. Each tag may be associated with a state configured to indicate the accessibility of an associated object(s) and one or more data structures 208, 209 configured to support operation of the TM system utilizing the transactional tags 205-207. Embodiments provide that the tag updates may be handled utilizing HTM optimistically lock free.

Figure 3:
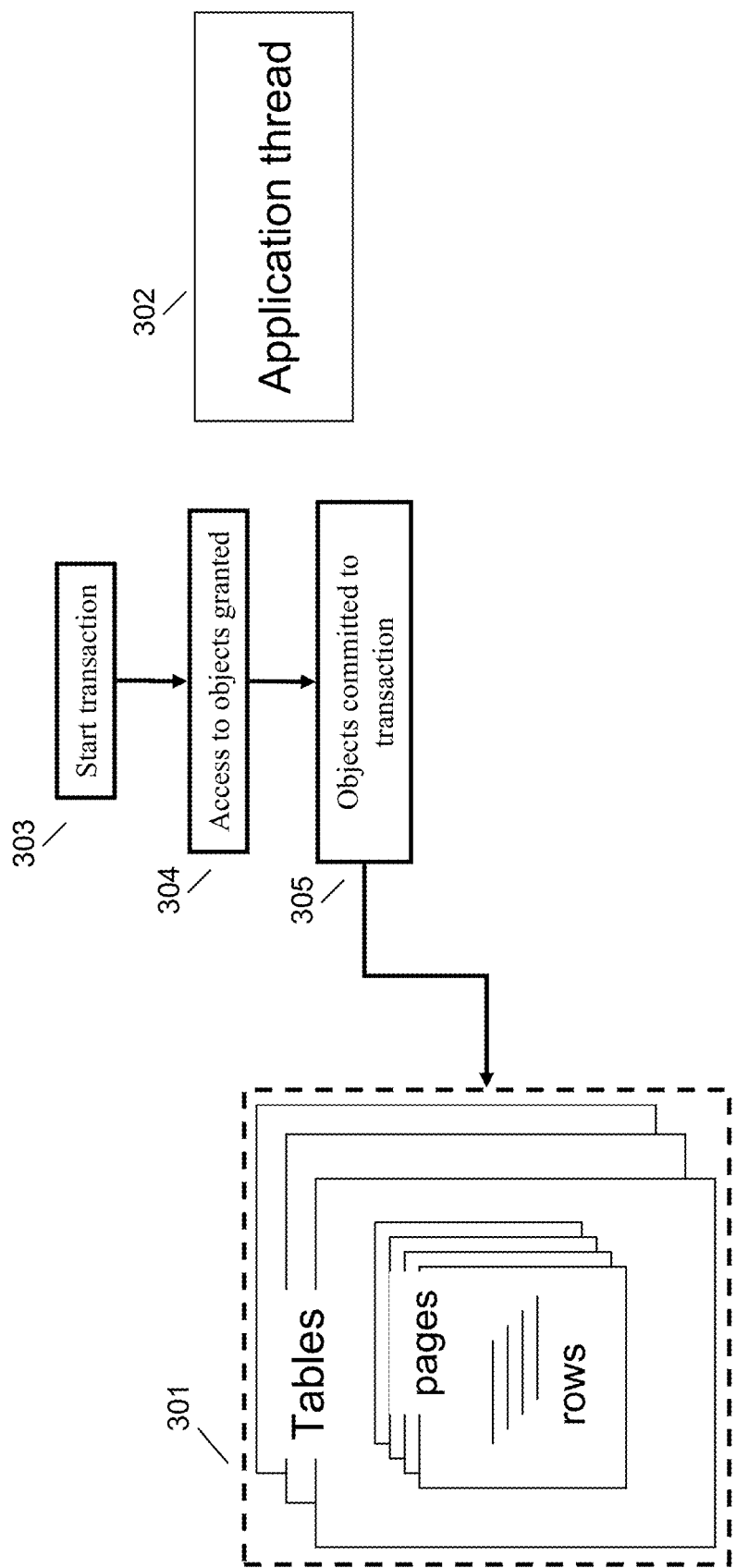
FIG. 3 provides an example of transaction processing according to an embodiment.

Referring to FIG. 3, therein is provided an example hybrid process configured according to an embodiment. The process interacts with a database 301 and an application thread 302. A transaction is initiated 303 and access to objects is granted 304 according to embodiments, for example, by optimistically updating object tags lock free within a Tagged_HTM_Tx function, which may be configured as follows:

```
Tagged_HTM_Tx_begin;
    update (all objects in the transaction scope);
OR
    abort and re-try/suspend
Tagged_HTM_Tx_end;
```

In addition, following the Tagged_HTM_Tx function, an undo object tag update may be initiated optimistically lock free utilizing HTM. Objects may then be committed 305 to the transaction. As a result of the process depicted in FIG. 3, tighter transaction code may be achieved, including implementing block updating interfaces between data engine layers.

As described hereinabove, the hybrid process may be configured according to embodiments to combine an optimistic mechanism and a blocking mechanism for database transaction execution on various data objects. Embodiments provide that access to a data object may involve the following two functions: (1) reserving the right to attempt access and the operation of access, for example, using HTM to handle the access attempt and related conflict detection and resolution; and (2) subsequent to reserving the attempted right, setting the data access operation as lock free such that if the attempted right is not reserved, the data access operation may be blocked.

Transaction processing may be configured according to embodiments by applying HTM to objects in a DBMS. Existing database objects may be augmented, for example, with a small data structure (e.g., tag and metadata) that may be used to describe the access intent and status of the data object. This data object may be, for example, a table, a file for a table partition, a record (e.g., within a page or cross-page), or a page etc. A data object may be referred to as "tagged data" if it is augmented. One or more application level APIs may be defined that may be configured to enable a transaction declaration on "tagged data." Implementation methods of the APIs may be provided such that declared transactions of "tagged data" may be executed as following transparently to applications. The privilege to access a data objects may be granted upon successful updates on its "tag," wherein the process of "tag" updating may be executed and managed via HTM optimistically. The data object may be accessed lock-free, upon successful reservation of access privilege. Multiple data object access may be handled by grouping them into a common declared transaction, such as those provided in the application level APIs described herein. The data object groups may be processed as a group optimistically via an HTM and utilizing lock-free access.

Transaction processes developed according to existing technology do not adequately handle concurrency control on large data objects, especially when utilizing HTM. As described previously herein, embodiments may address this issue by providing transaction processes configured to operate without utilizing a lock manager. A subject data structure (e.g., a tree, a data page, a document) may be augmented upon declaration. For example, augmentation may involve transaction tag counters utilized by the compiler of the programming language, wherein one counter may be for "active read" counts and another counter for "active write" counts as of "current time" on the data structure. Alternatively, the "active write" counter may consist of one or more bits. These counters may be referred to as the data structure's transaction tag.

Referring to FIGS. 4A-4C, therein are provided example APIs and associated implementations according to embodiments. Declarations, such as those depicted in FIGS. 4A-4C, may be extended to treat several discrete objects (such as a data page and an index page in database) and one "logical data unit," as shown in FIG. 5, below, augmented with a tag. In addition, embodiments may allow application to group objects at a transaction granularity. The example API's depicted in FIGS. 5A-5C illustrate single object transactions, while FIGS. 5A and 5B, below, illustrate transactions involving multiple objects.

Referring now to FIGS. 5A and 5B, therein is provided APIs configured according to embodiments. FIG. 5A depicts a Tagged_Tx_begin API and FIG. 5B depicts a Tagged_Tx_end API, which may be utilized for data access transactions on tagged data structures. Embodiments provide that a compiler or language interpreter may transform a transaction Tagged_Tx_begin and Tagged_Tx_end into an operation comprised of the following: (1) before an data item (of the data structure type) is read or updated, its transaction tag may be updated; (2) HTM may be utilized to handle the transaction tag updates; (3) if a thread commits on (1) and (2), it is entitled to update or read data structure content "transaction free;" (4) upon completion of (1), the data item's transaction tag may updated back correspondingly. In addition, embodiments provide that if an application issues a roll-back at the end, the un-do log records of existing DBMS may be used to repeat the data access transactions on tagged data structures as described herein, reversing the data update operations.

According to embodiments, steps (1)-(4) described above may be expanded to handle a transaction comprised of a mixture of small un-tagged data objects and large tagged data objects. For database applications, this may provide that ability to group discrete data objects, such as a set of pages, into an all-or-nothing transaction scope. Although such a configuration effectively amounts to a blocking mechanism from the prospective of data update, compared with a mechanism such as locking or latching, there is no concern about dead-lock or dead-latch situation, nor is there a need to look up lock tables either.

Applications may attempt to access uncommitted (e.g., "dirty") data. For example, a reader may attempt to read uncommitted data. Embodiments may provide additional APIs and associated implementations to handle uncommitted data, including, "update" and "dirty_read," APIs. For example, for an update operation on a logical object mapped to multiple data/index pages, a translation and execution function may be provided to translate certain APIs to one HW transaction ("tx_") that requests write access to all sub-object tags of the logical object (e.g., an additional hierarchy). An exemplary update API may be configured as follows:

```
Tagged_Update_Tx_begin;
        update a & b -- a & b belong to same logical object
Tagged_Update_Tx_end.
```

The update API may be translated for execution as follows:

```
Tx_begin;
        if (a_read_count > 0 or b_read_count > 0 or
        a_write_count=1 or
        b_write_count=1) abort;
    else
        a_write_count =1;
        b_write_count =1;
    Tx_end;
    if (TX_commit)
        update a
        update b
    else re-try;
    Tx_begin;
        a_write_count = 0;
        b_write_count = 0;
    Tx_end;
```

For a dirty read API, logical object group may be broken up into one-by-one smaller sub-object transactions, while maintaining one tag per object such that data consistency is maintained at the single object level. An exemplary dirty read API may be configured as follows:

```
Tagged_Dirty_read_Tx_begin;
    read a;
    read b;
Tagged_Dirty_Read_Tx_end;
```

The dirty read API may be translated for execution as follows:

```
Tx_begin;
    if ( a_write_count <>0 ) abort
    else a_read_count ++;
Tx_end;
if (TX_commit)
    read a
else re-try a or try b.
Tx_begin;
    if ( b_write_count <>0 ) abort
    else b_read_count ++;
    Tx_end;
if (TX_commit)
    read b
else re-try or go back if it has not been read yet.
```

Data objects may be handled as a hierarchy. For example, for a database, a hierarchy of objects may include, from top to bottom, table, page, and row objects. In addition, objects may be categorized in a hierarchy based on a local or global status. Accordingly, embodiments may provide additional tags to support a hierarchy level of blocking. As a non-limiting example, embodiments may provide table_global_write and table_global_read tags and, following this example, further tags may be provided: table_local_write/ table_local_read; page_global_write/page_global_read; and page_local_write/page_local_read. Hierarchy level blocking may be configured according to embodiments to support operations including updating local tags by local access, checking global tags by local access, and checking and updating global tags by global access.

Hierarchy level blocking may be configured to operate with coarser granularity. For example, drain and claim tags for a table may be provided in a centralized place and managed using HTM (instead of latching). However, according to embodiments, hierarchy locking may be configured by defining a specific set of tags. For a table or partition, the following tags may be defined: (1) table_global_write_count for granting table level locking and to block other table level locking threads; (2) table_global_intent_write_count which may be utilized to drain all page level writes so that a utility may eventually get access when there is an intent for table level lock; (3) table_local_write_count which may be configured to only grant table level locking when its value reaches 0 when pages are being updated; (4) table_read_count; and (5) table_page_read_count. At page level, each page may have table_global_write_count and table_global_intent_write_count tags configured to block new page update request when set to a non-zero value. In addition, all page level writes or row level writes may be configured to update a table_local_write_count tag, for example, by incrementing the tag before a write and decrementing thereafter. Since HTM often operates at cache line granularity, tags may be distributed (e.g., via hashing) to statistically minimize co-locating tags touched by different transactions in the same cache line.

In brief recapitulation, embodiments may be configured to provide processes to handle database transactions (including nested transactions) using HTM and a runtime implementation of one or more APIs. For example, the APIs may be transparent and may add annotations or tags to database objects. An application may access transaction objects based on successful HTM committed execution on the state changes (which may be un-done after access has been completed) of annotated objects, wherein access is either granted or denied. Granted accesses allow an application to update or read objects and denied access does not allow an application to access a particular object. According to embodiments, accesses to groups of objects may be granted on an all-or-nothing basis. For example, when a group's scope is defined as a set of objects, those objects in the group may be accessed according to an all-or-nothing process.

Figure 6:
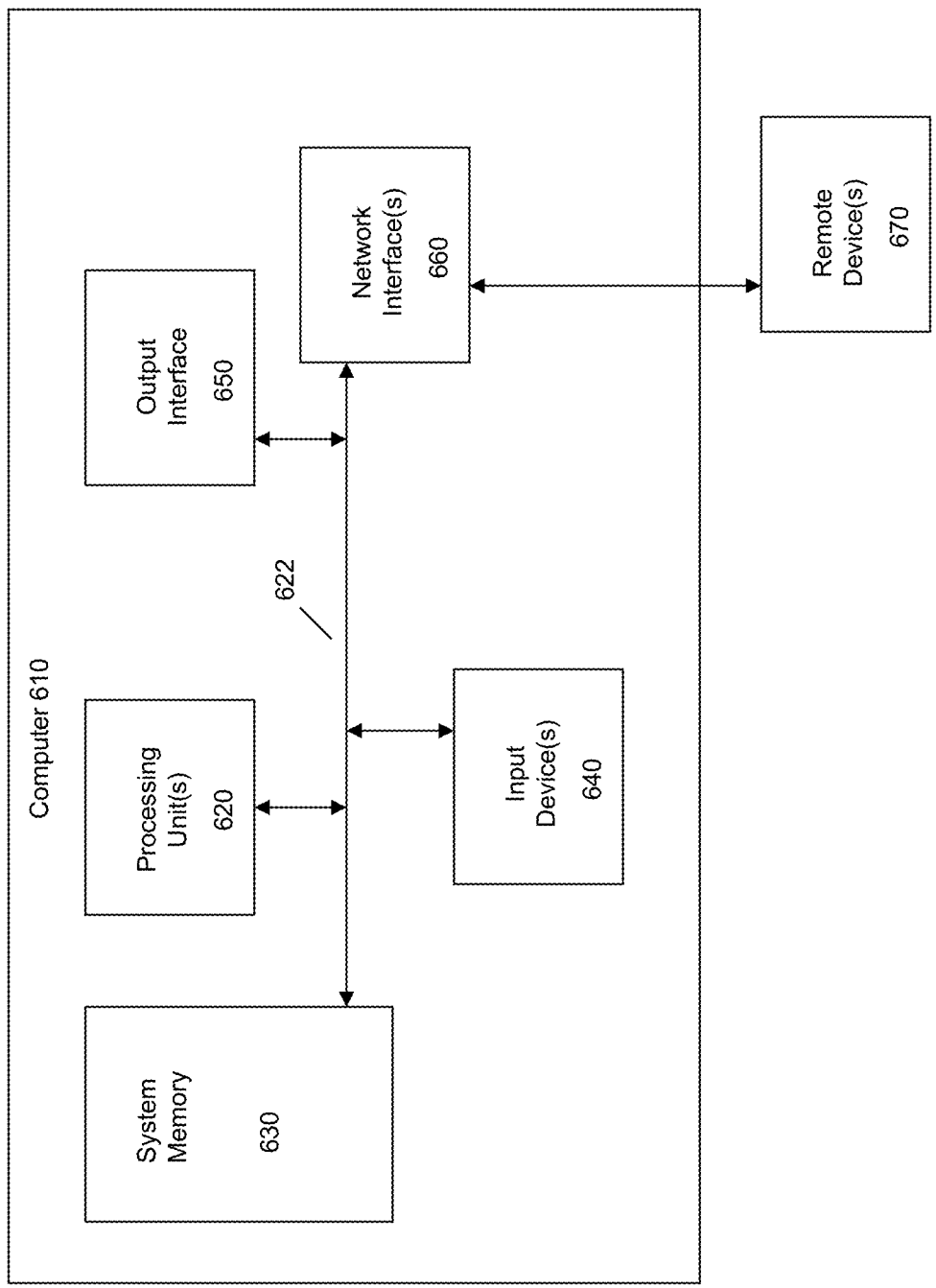
FIG. 6 illustrates an example computing device.

Referring to FIG. 6, it will be readily understood that certain embodiments can be implemented using any of a wide variety of devices or combinations of devices. An example device that may be used in implementing embodiments includes a computing device in the form of a computer 610, which may take the form of a server, a workstation computer, a mobile device, and the like. In this regard, the computer 610 may execute program instructions configured to provide predictive placement of content through network analysis, and perform other functionality of the embodiments, as described herein.

Components of computer 610 may include, but are not limited to, at least one processing unit 620, a system memory 630, and a system bus 622 that couples various system components including the system memory 630 to the processing unit(s) 620. The computer 610 may include or have access to a variety of computer readable media. The system memory 630 may include computer readable storage media in the form of volatile and/or nonvolatile memory such as read only memory (ROM) and/or random access memory (RAM). By way of example, and not limitation, system memory 630 may also include an operating system, application programs, other program modules, and program data.

A user can interface with (for example, enter commands and information) the computer 610 through input devices 640. A monitor or other type of device can also be connected to the system bus 622 via an interface, such as an output interface 650. In addition to a monitor, computers may also include other peripheral output devices. The computer 610 may operate in a networked or distributed environment using logical connections (network interface 660) to other remote computers or databases (remote device(s) 670). The logical connections may include a network, such local area network (LAN), a wide area network (WAN), a cellular network, but may also include other networks.

Those skilled in the art will recognize that aspects may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Although illustrated example embodiments have been described herein with reference to the accompanying drawings, it is to be understood that embodiments are not limited to those precise example embodiments, and that various other changes and modifications may be affected therein by one skilled in the art without departing from the scope or spirit of the disclosure.

What is claimed is:

1. A system comprising:
   at least one processor; and
   a memory device operatively connected to the at least one processor;
   wherein, responsive to execution of program instructions accessible to the at least one processor, the at least one processor is configured to:
   annotate at least one data object utilizing at least one transactional tag, the at least one transactional tag being configured to indicate a status of the at least one data object, wherein the status indicates the accessibility of the at least one data object;
   the at least one transactional tag further being associated with one or more data structures configured to support operation of a transactional memory process;
   process at least one database transaction using the at least one data object utilizing a transactional memory process, wherein access to the at least one data object is determined based on the status of the at least one data object, wherein to process comprises updating the transactional tag of the at least one data object to reserve access privilege of the at least one data object and setting access to the at least one data object as lock free, wherein the access privilege comprises a right to attempt access and operation of the at least one data object;
   update the status of at least one data object, having a status of uncommitted, responsive to an attempted access of the at least one uncommitted data object by the at least one database transaction having reserved access to the at least one data object, wherein to update the status comprises modifying the transactional tag of the at least one uncommitted data object by marking the at least one uncommitted data object as accessed; and
   blocking access to the at least one data object by a database transaction not having reserved access to the at least one data object.

2. The system according to claim 1, wherein the at least one processor is further configured to define at least one application programming interface configured to enable a transaction declaration on data annotated with a transactional tag.

3. The system according to claim 1, wherein the status of the at least one data object is updated via hardware transaction management.

4. The system according to claim 3, wherein hardware transaction management handles updating optimistically lock-free.

5. The system according to claim 1, wherein the at least one transactional tag comprises an active read counter and an active write counter.

6. The system according to claim 1, wherein the at least one transactional tag is transparent to applications invoking database transactions.

7. The system according to claim 1, wherein the update of the status of the at least one data object is undone responsive to completion of access to the at least one data object.

8. The system according to claim 1, wherein access to a plurality of data objects may be grouped.

9. The system according to claim 1, wherein access to a grouped plurality of data objects is granted on an all-or-nothing basis.

10. The system according to claim 1, wherein the at least one data object is defined within a database comprising table, page, and row elements.

11. A method comprising:
- annotating via a computing device at least one data object residing on the computing device utilizing at least one transactional tag, the at least one transactional tag being configured to indicate a status of an associated data object, wherein the status indicates the accessibility of the at least one data object;
- the at least one transactional tag further being associated with one or more data structures configured to support operation of a transactional memory process;
- processing at least one database transaction using the at least one data object utilizing a transactional memory process, wherein access to the at least one data object is determined based on the status of the at least one data object, wherein to process comprises updating the transactional tag of the at least one data object to reserve access privilege of the at least one data object and setting access to the at least one data object as lock free, wherein the access privilege comprises a right to attempt access and operation of the at least one data object;
- updating the status of at least one data object, having a status of uncommitted, responsive to an attempted access of the at least one uncommitted data object by the at least one database transaction having reserved access to the at least one data object, wherein updating the status comprises modifying the transactional tag of the at least one uncommitted data object by marking the at least one uncommitted data object as accessed; and
- blocking access to the at least one data object by a database transaction not having reserved access to the at least one data object.

12. The method according to claim 11, further comprising defining at least one application programming interface configured to enable a transaction declaration on data annotated with a transactional tag.

13. The method according to claim 11, wherein the status of the at least one data object is updated via hardware transaction management.

14. The method according to claim 13, wherein hardware transaction management handles updating optimistically lock-free.

15. The method according to claim 11, wherein the at least one transactional tag comprises an active read counter and an active write counter.

16. The method according to claim 11, wherein the at least one transactional tag is transparent to applications invoking database transactions.

17. The method according to claim 11, wherein the update of the status of the at least one data object is undone responsive to completion of access to the at least one data object.

18. The method according to claim 11, wherein access to a plurality of data objects may be grouped.

19. The method according to claim 11, wherein access to a grouped plurality of data objects is granted on an all-or-nothing basis.

20. A computer program product comprising:
- a non-transitory computer readable storage medium having computer readable program code embodied therewith, the computer readable program code comprising:
- computer readable program code configured to annotate at least one data object utilizing at least one transactional tag, the at least one transactional tag being configured to indicate a status of an associated data object, wherein the status indicates the accessibility of the at least one data object;
- the at least one transactional tag further being associated with one or more data structures configured to support operation of a transactional memory process;
- computer readable program code configured to process at least one database transaction using the at least one data object utilizing a transactional memory process, wherein access to the at least one data object is determined based on the status of the at least one data object, wherein to process comprises updating the transactional tag of the at least one data object to reserve access privilege of the at least one data object and setting access to the at least one data object as lock free, wherein the access privilege comprises a right to attempt access and operation of the at least one data object;
- computer readable program code configured to update the status of at least one data object, having a status of uncommitted, responsive to an attempted access of the at least one uncommitted data object by the at least one database transaction having reserved access to the at least one data object, wherein to update the status comprises modifying the transactional tag of the at least one uncommitted data object by marking the at least one uncommitted data object as accessed; and
- computer readable program code configured to block access to the at least one data object by a database transaction not having reserved access to the at least one data object.

\* \* \* \* \*